(12) United States Patent
Huang et al.

(10) Patent No.: US 9,198,040 B2
(45) Date of Patent: Nov. 24, 2015

(54) DEPLOYING WIRELESS DOCKING AS A SERVICE

(71) Applicant: QUALCOMM Incorporated, San Diego, CA (US)

(72) Inventors: Xiaolong Huang, San Diego, CA (US); Andrew Mackinnon Davidson, Monte Sereno, CA (US); Rolf De Vegt, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/023,217

(22) Filed: Sep. 10, 2013

(65) Prior Publication Data

US 2014/0196125 A1 Jul. 10, 2014

Related U.S. Application Data

(60) Provisional application No. 61/768,063, filed on Feb. 22, 2013, provisional application No. 61/749,170, filed on Jan. 4, 2013.

(51) Int. Cl.
| | |
|---|---|
| *H04W 12/06* | (2009.01) |
| *H04L 29/06* | (2006.01) |
| *H04W 76/02* | (2009.01) |
| *H04W 84/18* | (2009.01) |

(52) U.S. Cl.
CPC .............. *H04W 12/06* (2013.01); *H04L 63/083* (2013.01); *H04W 76/023* (2013.01); *H04W 84/18* (2013.01)

(58) Field of Classification Search
CPC .................................................... H04W 12/00
See application file for complete search history.

(56) References Cited

U.S. PATENT DOCUMENTS

| | | | |
|---|---|---|---|
| 8,019,883 B1 * | 9/2011 | Margulis ...................... 709/231 |
| 8,254,992 B1 | 8/2012 | Ashenbrenner et al. |
| 2006/0233191 A1 | 10/2006 | Pirzada et al. |
| 2010/0293219 A1 * | 11/2010 | Pohjanen ...................... 709/202 |
| 2012/0099566 A1 * | 4/2012 | Laine et al. .................... 370/338 |
| 2012/0131353 A1 * | 5/2012 | Nasir et al. ..................... 713/189 |
| 2012/0243524 A1 | 9/2012 | Verma et al. |
| 2012/0265913 A1 * | 10/2012 | Suumaki et al. .............. 710/303 |
| 2012/0322368 A1 | 12/2012 | Desai et al. |
| 2013/0016629 A1 | 1/2013 | Mallik et al. |
| 2013/0064175 A1 | 3/2013 | Pandey et al. |

(Continued)

FOREIGN PATENT DOCUMENTS

EP       1887730 A1    2/2008

OTHER PUBLICATIONS

"HP xb4000 Media Notebook Docking Station" —HP, Apr. 2008 http://www.hp.com/ctg/Manual/c01621869.pdf.*

(Continued)

*Primary Examiner* — Randy Scott
(74) *Attorney, Agent, or Firm* — Shumaker & Sieffert, P.A.

(57) ABSTRACT

A wireless dockee device may include a memory, and at least one processor configured to authenticate the wireless dockee to a wireless docking service using a Wi-Fi direct service (WFDS) application service platform (ASP). A wireless docking center device may include a memory, and at least one processor configured to authenticate a wireless dockee to a wireless docking service of a wireless docking center using a Wi-Fi direct service (WFDS) application service platform (ASP).

44 Claims, 6 Drawing Sheets

(56) References Cited

U.S. PATENT DOCUMENTS

2013/0100855 A1    4/2013  Jung et al.
2014/0075075 A1*   3/2014  Morrill et al. ................ 710/303

OTHER PUBLICATIONS

International Search Report and Written Opinion—PCT/US2013/071743—ISA/EPO—Mar. 19, 2014, 12 pp.

"Wi-Fi Peer-to-Peer (P2P) Technical Specification," Wi-Fi Alliance Technical Committee P2P Task Group, version 1.1, 2010, pp. 1-159.

U.S. Appl. No. 14/023,205, filed Sep. 10, 2013, by Xiaolong Huang.

Second Written Opinion from International Application No. PCT/US2013/071743, dated Dec. 22, 2014, 5 pp.

WIFI ALLIANCE, "Wi-Fi Simple Configuration Technical Specification", Version 2.0.5, XP055158480, Jun. 1, 2014, 155 pp.

International Preliminary Report on Patentability from corresponding PCT Application Serial No. PCT/US2013/071743 mailed Mar. 26, 2015 (21 pages).

* cited by examiner

DEPLOYING WIRELESS DOCKING AS A SERVICE

This application claims priority to U.S. Provisional Application No. 61/768,063, filed Feb. 22, 2013, and U.S. Provisional Application No. 61/749,170, filed Jan. 4, 2013, the entire content of each of which is incorporated herein by reference.

TECHNICAL FIELD

This disclosure relates to techniques for wireless docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations typically require a physical connection between the electronic device and the docking station. Additionally, the electronic device and the docking station typically establish docking communications before docking functions may be used.

SUMMARY

The techniques of this disclosure provide techniques for authenticating a wireless dockee with services of a wireless docking center, such as a wireless docking service, and one or more peripheral function services. The wireless docking station may authenticate the wireless dockee based on secret data that is transmitted between the wireless docking station and the wireless dockee.

In one example, this disclosure describes a method comprising authenticating, by a wireless docking center, a wireless dockee, to a wireless docking service using a Wi-Fi direct service (WFDS) application service platform (ASP).

In another example, this disclosure described a method comprising authenticating, by a wireless dockee, to a wireless docking service of a wireless docking center using a Wi-Fi direct service (WFDS) application service platform (ASP).

In another example, this disclosure describes an apparatus comprising means for authenticating, by a wireless docking center, a wireless dockee, to a wireless docking service using a Wi-Fi direct service (WFDS) application service platform (ASP).

In another example, this disclosure describes an apparatus comprising means for authenticating, by a wireless dockee, to a wireless docking center, to a wireless docking service using a Wi-Fi direct service (WFDS) application service platform (ASP).

In another example, this disclosure describes an apparatus comprising a memory, and a processor configured to authenticate a wireless dockee to a wireless docking service of a wireless docking center using a Wi-Fi direct service (WFDS) application service platform (ASP).

In another example, this disclosure describes an apparatus comprising a memory, and a processor configured to authenticate to a wireless docking service of a wireless docking center using a Wi-Fi direct service (WFDS) application service platform (ASP).

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to techniques for making a wireless docking service, referred to as a Wi-Fi Docking Service (WFDS), available using an application service platform (ASP).

Figure 1:
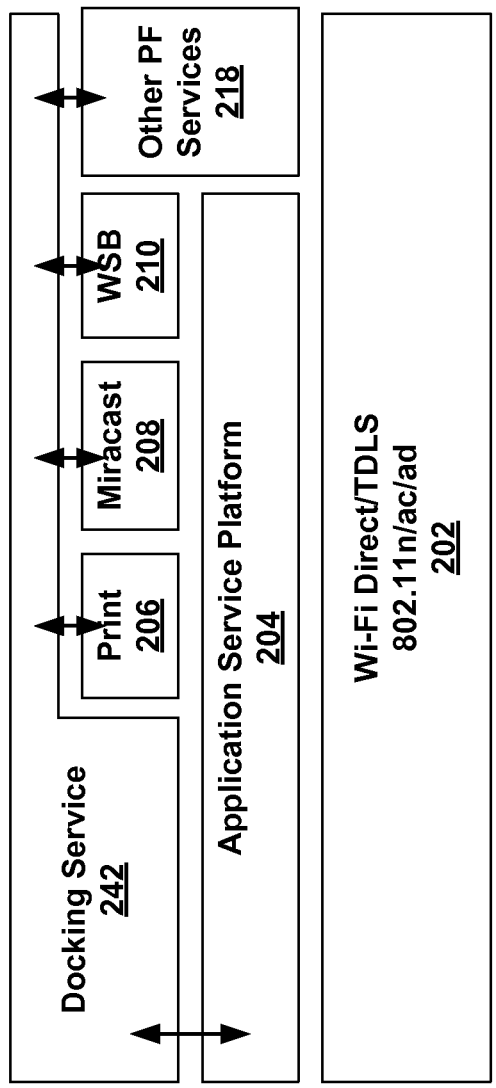
FIG. 1 is a block diagram illustrating an example interface between a docking service, an application service platform (ASP), and other services.

FIG. 1 is a block diagram illustrating an example interface between a docking service, an application service platform (ASP), and other services. In the example of FIG. 1, Docking Service 242 may be a docking service at a Wireless Docking Center (WDC). The wireless docking center is built on the Wi-Fi Direct Services (WFDS) 202 and Application Service Platform (ASP) 204, which enable Docking Service 242 at a Wireless Dockee to wirelessly connect to the WDC and manage the use of peripheral function services that are associated with the WDC. The peripheral function services may or may not be on ASP in various examples. FIG. 1 illustrates the interface between Wi-Fi Direct Docking Service 242, ASP 204, and other services.

The interface between Docking Service 242 at the WDC and ASP 204 allows Docking Service 242 at a WDC to perform the following services. First, the interface between the WDC and ASP 204 allows Docking Service 242 to advertise Docking Service 242 at the WDC, such as peripheral functions that Docking Service 242 manages, and the capabilities required to drive the use of the peripheral functions of Docking Service 242. The interface between the WDC and ASP 204 also allows Docking Service 242 to enable a Dockee to wirelessly connect to the WDC and manage the use of peripherals that are associated with the WDC through a Docking Session.

The interface between Docking Service 242 at the Dockee and ASP 204 allows Docking Service 242 at a Dockee to seek Docking Service 242 at a WDC, including peripheral functions the WDC manages and capabilities required to drive the use of the peripheral functions of the WDC. The interface between Docking Service 242 at the Dockee and ASP 204 also allows Docking Service 242 at a Dockee to wirelessly connect to the WDC and manage the use of peripherals that are associated with the WDC through a Docking Session.

The interface between Docking Service 242 at the WDC allows Docking Service 242 at the WDC to perform additional functionality. As an example, the interface between Docking Service 242 and other services may allow Docking Service 242 to control the dockee's access to other services at the WDC. As another example, the interface between Docking Service 242 and other services may allow Docking Service 242 to control the functions provided by another service at the WDC in order to provide differentiated services to different Dockees.

Additionally, the interface between Docking Service 242 at the Dockee and other services, such as Print service 206, Miracast service 208, Wi-Fi Serial Bus (WSB) 210, and other peripheral services 218 allows Docking Service 242 at the WDC to trigger another service at the Dockee to seek and use the corresponding service at a WDC.

Figure 2:
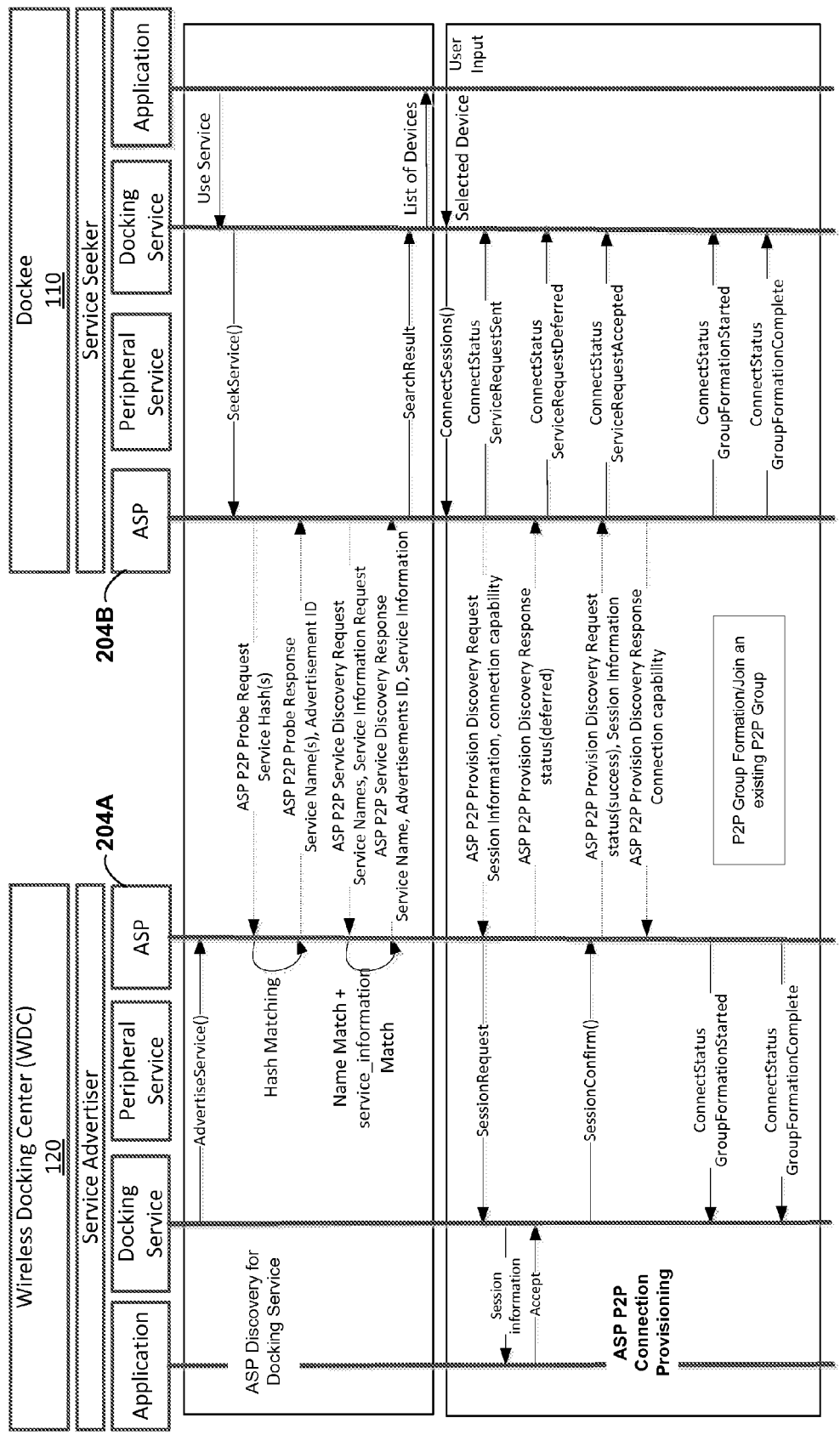
FIG. 2 is a first flow diagram illustrating the call flow of a docking service session setup.
Figure 3:
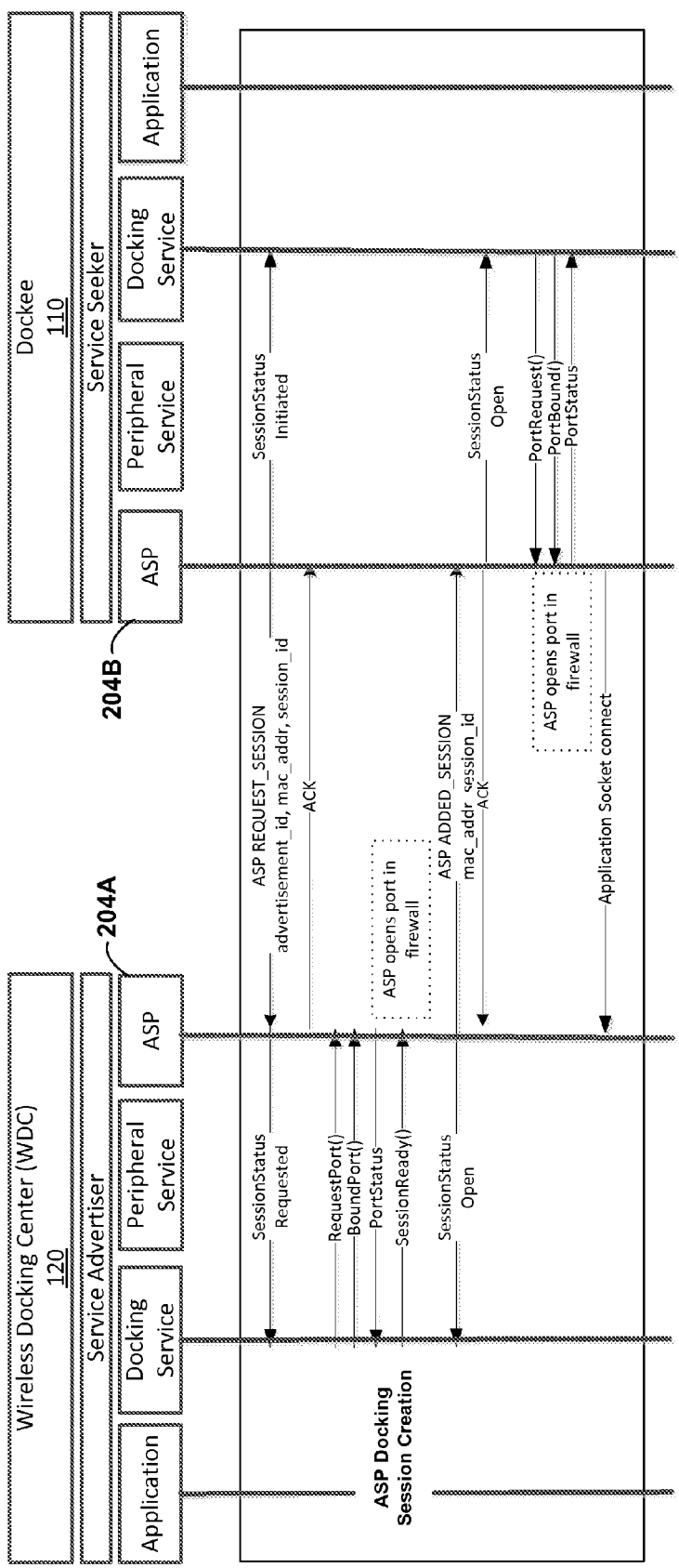
FIG. 3 is a second flow diagram illustrating the call flow of a docking service session setup.
Figure 4:
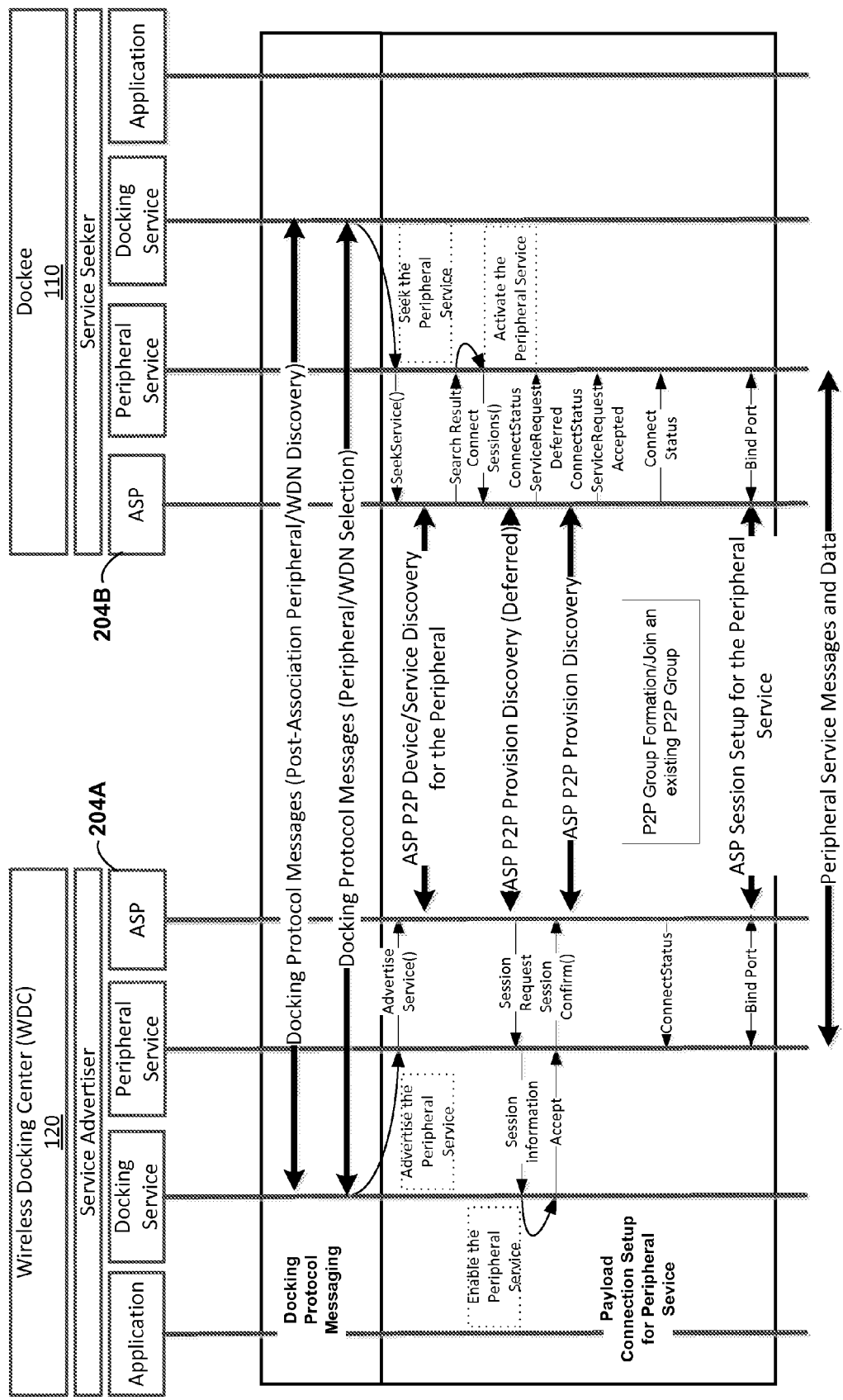
FIG. 4 is a third flow diagram illustrating the call flow of a docking service session setup.

FIGS. 2-4 are flow diagrams illustrating a call flow of a docking service session setup. More particularly, FIG. 2 is a first flow diagram illustrating the call flow of a docking service session setup. FIG. 3 is a second flow diagram illustrating the call flow of a docking service session setup, and FIG. 4 is a third flow diagram illustrating the call flow of a docking service session setup.

In the example of FIGS. 2-4, a Docking Service, uses an ASP to perform the pre-association device and service discovery. If the Docking Service provided by WDC 120 matches the interests of Dockee 110, the Docking Service on WDC 120 and the Docking Service on Dockee 110 can use ASP 204A to perform the P2P provision discovery and subsequently form a P2P group to include WDC 120 and Dockee 110. An ASP Session will then be created between WDC 120 and Dockee 110 for the Docking Service.

All the Docking Control/Configuration Protocol operations are performed within the ASP session of the Docking Service. The Docking Control/Configuration Protocol is used for post-association peripheral/WDN discovery, peripheral/WDN selection and the capability negotiation for payload connections that are needed for peripheral function protocols.

Before the peripheral/WDN selection and the capability negotiation for payload connections are completed, the Docking Service blocks the access to its peripheral function services using the interface that the Docking Service has with the other peripheral function services.

After the peripheral/WDN selection and the capability negotiation for payload connections are completed, the Docking Service at WDC 120 allows Dockee 110 to access those services that WDC 120 has agreed on in the Docking Service.

The WFDS ASP also provides a level of security in authenticating Dockee 110 to use the Docking Service. For a higher level of security, the authentication for Dockee 110 to use the Docking Service may be implemented in the Docking service itself.

The WFDS ASP may also provide a level of security in authenticating Dockee 110 to use the peripheral function services. In addition, the Docking Service facilitates creating secrets between WDC 120 and Dockee 110 for access control of the peripheral function services. Information derived from such secrets is put into the Provision Discovery Service Instance Data Info in the ASP P2P Provision Discovery exchange to authenticate and authorize Dockee 110, when Dockee 110 performs the ASP session setup for the peripheral function service. For a higher level of security, the authentication for Dockee 110 to use the peripheral function service may be implemented in the peripheral function service itself.

The Docking Service interacts with ASP 204A at docking center 120. More particularly, the ASP may provide an interface which allows the Docking Service to perform device and service discovery and service confirmation during pre-association state. The docking service may use the Docking AdvertiseService method, which may have the following syntax:
AdvertiseService(service_name, port, proto, share, auto_accept, service_information)

The ASP may also provide an interface, which allows the docking service to perform device and service discovery and service confirmation during the pre-association state. The docking service may use the SeekService method primitive at Dockee 110. The Docking SeekService Method may have the following syntax:
SeekService(service_name, exact_search, mac_address, service_information_request).

Figure 5:
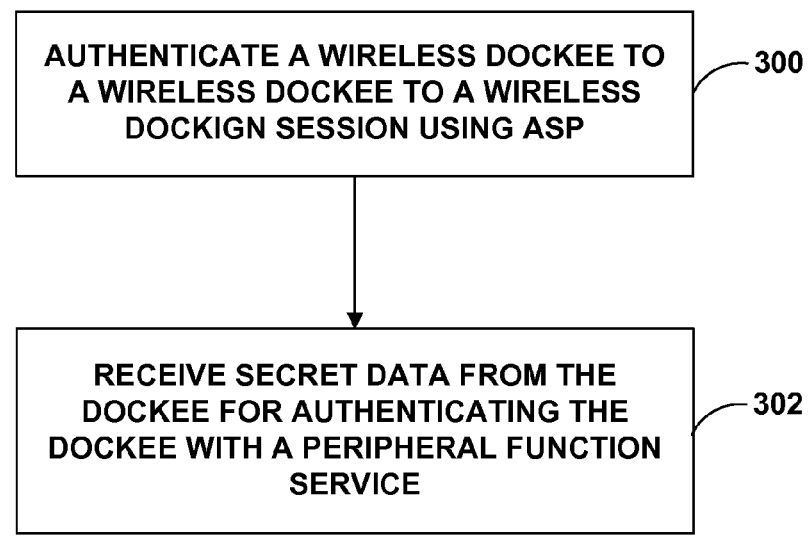
FIG. 5 is a flowchart illustrating techniques for authenticating, by a docking center, a dockee with a wireless docking service using an application service platform (ASP) in accordance with the techniques of this disclosure.

FIG. 5 is a flowchart illustrating techniques for authenticating, by a docking center, a dockee with a wireless docking service using an application service platform (ASP) in accordance with the techniques of this disclosure.

The method of FIG. 5 may correspond to some examples of actions performed by wireless docking center 120 implementing Wireless Docking Service 242A in the docking session procedures of FIGS. 2-4, and may be performed by wireless dockee 110 in some examples. In the method illustrated in FIG. 6, wireless dockee 110 may authenticate a wireless dockee to a wireless docking service of wireless docking center 120 using a Wi-Fi direct service (WFDS) application service platform (ASP) (300). In some examples, authenticating the wireless dockee to the WFDS may be based on secret data.

In another example, to authenticate the wireless dockee to the WFDS based on secret data, the at least one processor may be configured to transmit the secret data during an ASP peer to peer (P2P) provision discovery exchange. In yet another example, wireless docking center 120 may be configured to establish a wireless docking service session using the ASP. In some examples, wireless docking center 120 may authenticate wireless dockee 110 with a peripheral function service of wireless docking center 120.

In the method of FIG. 5, wireless docking center 120 may be further configured to receive, from wireless dockee 110, secret data for authenticating wireless dockee 110 with the peripheral function service (302). To authenticate wireless dockee 110 to the peripheral service, wireless docking center 120 may be further configured to authenticate wireless dockee 110 based on the secret data for authenticating wireless dockee 110 with the peripheral function service.

In yet another example, wireless docking center 120 may receive the secret data for authenticating wireless dockee 110 with the peripheral function service during an ASP peer to peer (P2P) provision discovery exchange. In another example, wireless docking center 120 may be further configured to create a peripheral function service session for the peripheral function service using the ASP.

Figure 6:
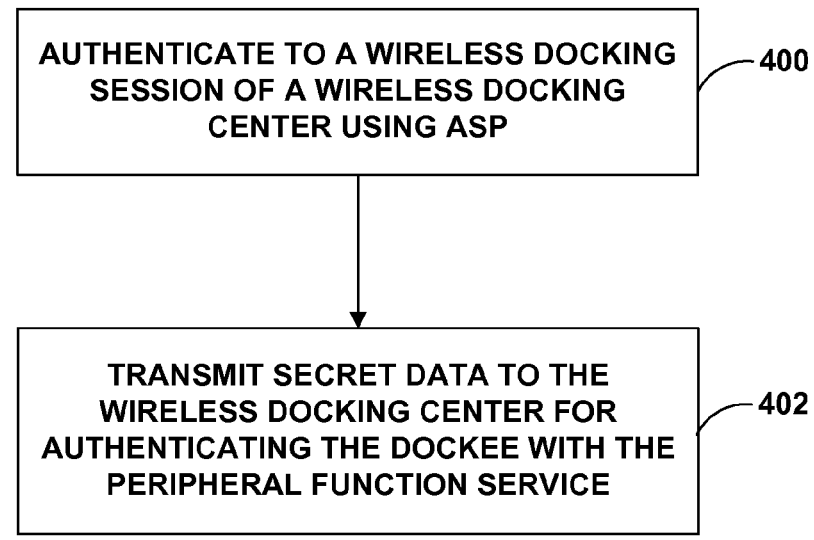
FIG. 6 is a flowchart illustrating techniques for authenticating, by a dockee, with a wireless docking service of a docking center using an application service platform (ASP) in accordance with the techniques of this disclosure.

FIG. 6 is a flowchart illustrating techniques for authenticating, by a dockee, with a wireless docking service of a docking center using an application service platform (ASP) in accordance with the techniques of this disclosure. The method of FIG. 6 may correspond to some examples of actions performed by wireless dockee 110 implementing Wireless Docking Service 242B in the docking session procedure of FIGS. 2-4, among other examples disclosed herein, and may be performed by wireless docking center 120, in some examples.

In the method of FIG. 6, wireless dockee 110 may be configured to authenticate to a wireless docking service of a wireless docking center using a Wi-Fi direct service (WFDS) application service platform (ASP) (400). In some examples, the apparatus of claim 46, wherein authenticating the wireless dockee to the WFDS is based on secret data.

In some examples, the secret data may be transmitted during an ASP peer to peer (P2P) provision discovery exchange. In another example, wireless dockee 110 may establish a wireless docking service session using the ASP. In another example, wireless dockee 110 may authenticate with a peripheral function service of wireless docking center 120.

In the method of FIG. 6, wireless dockee 110 may be further configured to transmit to wireless docking center 120, secret data for authenticating with the peripheral function service (402), and to authenticate with the peripheral service wireless dockee 110 may be further configured to authenticate to the peripheral service of wireless docking center 120 based on the secret data for authenticating with the peripheral function service.

In some examples the secret data for authenticating with the peripheral service may be transmitted by wireless dockee 110 during an ASP peer to peer (P2P) provision discovery exchange. In another example, wireless dockee 110 may create a peripheral function service session using the ASP.

In another example, wireless dockee 110 may receive, from wireless docking center 120, secret data for authenticating with the peripheral function service of wireless docking center 120.

What is claimed is:

1. A method comprising:
    authenticating, by a wireless docking center, a wireless dockee, to a wireless docking service of the wireless docking center using a Wi-Fi direct service (WFDS) application service platform (ASP);
    establishing, by the wireless docking center, a wireless docking service session using the WFDS ASP;
    receiving, by the wireless docking center, from the wireless dockee, a request for a peripheral function service associated with the peripheral that is communicatively coupled with the wireless docking center;
    performing, by the wireless docking center, capability negotiation for the peripheral function service; and
    creating, by the wireless docking center, a session of the requested peripheral function service using the ASP.

2. The method of claim 1, wherein authenticating the wireless dockee to the WFDS is based on secret data.

3. The method of claim 2, wherein authenticating the wireless dockee to the WFDS based on secret data further comprises:
    transmitting the secret data during an ASP peer to peer (P2P) provision discovery exchange.

4. The method of claim 1, further comprising:
    authenticating, by the wireless docking center, the wireless dockee, with a peripheral function service of the wireless docking center.

5. The method of claim 4, further comprising:
    receiving, by the wireless docking center, from the wireless dockee, secret data for authenticating the dockee with the peripheral function service,
    wherein authenticating the dockee to the peripheral function service further comprises authenticating, by the wireless docking center, the dockee based on the secret data for authenticating the dockee with the peripheral function service.

6. The method of claim 5, wherein the secret data for authenticating the dockee with the peripheral function service is received during an ASP peer to peer (P2P) provision discovery exchange.

7. The method of claim 4, further comprising:
    creating, by the wireless docking center, secret data for authenticating the dockee with a peripheral function service of the wireless docking center; and
    transmitting, by the wireless docking center, to the dockee, the secret data for authenticating the dockee with the peripheral function service.

8. A method comprising:
    transmitting, by a wireless dockee, to the wireless docking center, an ASP (Application Service Platform) session request for a wireless docking service of the wireless docking center;
    authenticating, by a wireless dockee, to a wireless docking service of a wireless docking center using a Wi-Fi direct service (WFDS) ASP;
    accessing the wireless docking service;
    transmitting, by the wireless dockee, to the wireless docking center, a request for a peripheral function service associated with the peripheral that is communicatively coupled with the wireless docking center; and
    establishing, by the wireless dockee and to the wireless docking center, a session of the requested peripheral function service using the ASP.

9. The method of claim 8, wherein authenticating the wireless dockee to the WFDS is based on secret data.

10. The method of claim 9, wherein the secret data is transmitted during an ASP peer to peer (P2P) provision discovery exchange.

11. The method of claim 8, further comprising:
    authenticating, by the wireless dockee, with a peripheral function service of the wireless docking center.

12. The method of claim 11, further comprising:
    transmitting, by the wireless dockee, to the wireless docking center, secret data for authenticating the dockee with the peripheral function service,
    wherein authenticating with the peripheral service further comprises authenticating, by the wireless dockee, to the peripheral service of the wireless docking center based on the secret data for authenticating the dockee with the peripheral function service.

13. The method of claim 12, wherein the secret data for authenticating the dockee with the peripheral service is transmitted by the wireless dockee during an ASP peer to peer (P2P) provision discovery exchange.

14. The method of claim 11, further comprising:
    receiving, by the wireless dockee, from the wireless docking center, secret data for authenticating the dockee with the peripheral function service of the wireless docking center.

15. An apparatus comprising:
    means for authenticating, by a wireless docking center, a wireless dockee, to a wireless docking service of the wireless docking center using a Wi-Fi direct service (WFDS) application service platform (ASP);
    means for establishing, by the wireless docking center, a wireless docking service session using the WFDS ASP;
    means for receiving, by the wireless docking center, from the wireless dockee, a request for a peripheral function service associated with the peripheral that is communicatively coupled with the wireless docking center;
    means for performing, by the wireless docking center, capability negotiation for the peripheral function service; and
    means for establishing, by the wireless docking center, a session of the requested peripheral function service to the wireless dockee using the ASP.

16. The apparatus of claim 15, wherein authenticating the wireless dockee to the WFDS is based on secret data.

17. The apparatus of claim 16, wherein authenticating the wireless dockee to the WFDS based on secret data further comprises:
means for transmitting the secret data during an ASP peer to peer (P2P) provision discovery exchange.

18. The apparatus of claim 15, further comprising:
means for authenticating, by the wireless docking center, the wireless dockee, with a peripheral function service of the wireless docking center.

19. The apparatus of claim 18, further comprising:
means for receiving, by the wireless docking center, from the wireless dockee, secret data for authenticating the dockee with the peripheral function service,
wherein the means for authenticating the dockee to the peripheral function service further comprises means for authenticating, by the wireless docking center, the dockee based on the secret data for authenticating the dockee with the peripheral function service.

20. The apparatus of claim 19, wherein the secret data for authenticating the dockee with the peripheral function service is received during an ASP peer to peer (P2P) provision discovery exchange.

21. The apparatus of claim 18, further comprising:
means for creating, by the wireless docking center, secret data for authenticating the dockee with a peripheral function service of the wireless docking center; and
means for transmitting, by the wireless docking center, to the dockee, the secret data for authenticating the dockee with the peripheral function service.

22. An apparatus comprising:
means for authenticating, by a wireless dockee, to a wireless docking center, to a wireless docking service of the wireless docking center using a Wi-Fi direct service (WFDS) ASP;
means for establishing, by the wireless docking center, a wireless docking service session using the WFDS ASP;
means for receiving, by the wireless docking center, from the wireless dockee, a request for a peripheral function service associated with the peripheral that is communicatively coupled with the wireless docking center;
means for performing, by the wireless docking center, capability negotiation for the peripheral function service; and
means for establishing, by the wireless docking center, a session of the requested peripheral function service to the wireless dockee using the ASP.

23. The apparatus of claim 22, wherein the means for authenticating the wireless dockee to the WFDS is based on secret data.

24. The apparatus of claim 23, wherein the secret data is transmitted during an ASP peer to peer (P2P) provision discovery exchange.

25. The apparatus of claim 22, further comprising:
establishing, by the wireless dockee, a wireless docking service session using the ASP.

26. The apparatus of claim 22, further comprising:
means for authenticating, by the wireless dockee, with a peripheral function service of the wireless docking center.

27. The apparatus of claim 26, further comprising:
means for transmitting, by the wireless dockee, to the wireless docking center, secret data for authenticating the dockee with the peripheral function service,
wherein the means for authenticating with the peripheral service further comprises means for authenticating, by the wireless dockee, to the peripheral service of the wireless docking center based on the secret data for authenticating the dockee with the peripheral function service.

28. The apparatus of claim 27, wherein the secret data for authenticating the dockee with the peripheral service is transmitted by the wireless dockee during an ASP peer to peer (P2P) provision discovery exchange.

29. The apparatus of claim 26, further comprising:
means for creating, by the wireless docking center, a peripheral function service session using the ASP.

30. The apparatus of claim 26, further comprising:
means for receiving, by the wireless dockee, from the wireless docking center, secret data for authenticating the dockee with the peripheral function service of the wireless docking center.

31. An apparatus comprising:
a memory; and
at least one processor configured to:
transmit, to a wireless docking center, an ASP (Application Service Platform) session request for a wireless docking service of the wireless docking center;
authenticate a wireless dockee to a wireless docking service of the wireless docking center using a Wi-Fi direct service (WFDS) ASP;
access the wireless docking service;
transmit, to the wireless docking center, a request for a peripheral function service associated with the peripheral that is communicatively coupled with the wireless docking center; and
establish, to the wireless docking center, a session of the requested peripheral function service using the ASP.

32. The apparatus of claim 31, wherein authenticating the wireless dockee to the WFDS is based on secret data.

33. The apparatus of claim 32, wherein to authenticate the wireless dockee to the WFDS based on secret data, the at least one processor is further configured to:
transmit the secret data during an ASP peer to peer (P2P) provision discovery exchange.

34. The apparatus of claim 31, wherein the at least one processor is further configured to:
authenticate the wireless dockee with a peripheral function service of a wireless docking center.

35. The apparatus of claim 34, wherein the at least one processor is further configured to:
receive, from the wireless dockee, secret data for authenticating the dockee with the peripheral function service,
wherein to authenticate the dockee to the peripheral function service, the at least one processor is further configured to authenticate the dockee based on the secret data for authenticating the dockee with the peripheral function service.

36. The apparatus of claim 35, wherein the secret data for authenticating the dockee with the peripheral function service is received during an ASP peer to peer (P2P) provision discovery exchange.

37. The apparatus of claim 34, wherein the at least one processor is further configured to:
create secret data for authenticating the dockee with a peripheral function service of the wireless docking center; and
transmit to the dockee, the secret data for authenticating the dockee with the peripheral function service.

38. An apparatus comprising:
a memory; and
at least one processor configured to:
authenticate to a wireless docking service of a wireless docking center using a Wi-Fi direct service (WFDS) application service platform (ASP);
establish a wireless docking service session using the WFDS ASP;
receive, from the wireless dockee, a request for a peripheral function service associated with the peripheral that is communicatively coupled with the wireless docking center;
perform capability negotiation for the peripheral function service; and
create a session of the requested peripheral function service using the ASP.

39. The apparatus of claim 38, wherein authenticating to the WFDS is based on secret data.

40. The apparatus of claim 39, wherein the secret data is transmitted during an ASP peer to peer (P2P) provision discovery exchange.

41. The apparatus of claim 38, wherein the at least one processor is further configured to:
authenticate with a peripheral function service of the wireless docking center.

42. The apparatus of claim 41, further comprising:
transmit to the wireless docking center, secret data for authenticating with the peripheral function service,
wherein to authenticate with the peripheral service, the at least one processor is further configured to authenticate to the peripheral service of the wireless docking center based on the secret data for authenticating with the peripheral function service.

43. The apparatus of claim 42, wherein the secret data for authenticating with the peripheral service is transmitted by the wireless dockee during an ASP peer to peer (P2P) provision discovery exchange.

44. The apparatus of claim 41, wherein the at least one processor is further configured to:
receive, from the wireless docking center, secret data for authenticating with the peripheral function service of the wireless docking center.

* * * * *